United States Patent [19]
Houle

[11] Patent Number: 6,044,980
[45] Date of Patent: Apr. 4, 2000

[54] DRUM PRESS EXTRACTOR

[75] Inventor: Michel Houle, Wickham, Canada

[73] Assignee: J. Houle & Fils Inc., Drummondville, Canada

[21] Appl. No.: 09/123,557

[22] Filed: Jul. 29, 1998

Related U.S. Application Data

[63] Continuation-in-part of application No. 08/791,422, Jan. 30, 1997, abandoned.

[51] Int. Cl.$^7$ .............................. B01D 33/06; B30B 9/20
[52] U.S. Cl. ...................... 210/396; 210/402; 100/121; 100/137
[58] Field of Search .................................... 210/391, 396, 210/402, 403, 404; 100/104, 121, 137

[56] References Cited

U.S. PATENT DOCUMENTS

| | | |
|---|---|---|
| 1,032,167 | 7/1912 | Vernsten . |
| 1,238,289 | 8/1917 | Hare . |
| 1,385,341 | 7/1921 | Wagner . |
| 1,816,132 | 7/1931 | Strindlund . |
| 3,198,695 | 8/1965 | Justus . |
| 3,429,256 | 2/1969 | Baileau . |
| 4,040,190 | 8/1977 | Van Den Broek . |
| 4,366,025 | 12/1982 | Gordon, Jr. . |
| 4,566,381 | 1/1986 | Nikulainen . |
| 4,765,550 | 8/1988 | Chen . |
| 4,989,305 | 2/1991 | Pole . |
| 5,205,930 | 4/1993 | Obrestad . |
| 5,470,471 | 11/1995 | Luthi et al. . |

OTHER PUBLICATIONS

1) Johnson Industrial Screens, "Johnson Filtration Systems", 15 pages.

Primary Examiner—Robert J. Popovics
Attorney, Agent, or Firm—Oblon, Spivak, McClelland, Maier & Neustadt, P.C.

[57] ABSTRACT

An apparatus for extracting liquids from a slurry formed of liquids and fibers, like diluted manure or paper mills residue. The apparatus has a rotatable drum covered with a resilient layer. The apparatus also has two draining rolls which are pressed against the drum so that the slurry passing in between is squeezed. Each roll has a hollow cylindrical shell with a uniform distribution of openings. Each roll also has a perforated filter screen fixed to is. The screen has perforations evenly distributed so that only some perforations lie over the openings in the shell. The perforations are smaller in size than the openings. The apparatus also has a pair of wipers in order to wipe the fibers out of the draining rolls and guide the liquids collected in the shells towards a liquids outlet. A reservoir can be mounted above the drum and upper draining roll for receiving the slurry, storing it to build-up a constant pressure, and supplying it in a continuous manner. An endless screw can also be mounted on top of the drum to scrape the fibers that may remain attached.

14 Claims, 4 Drawing Sheets

DRUM PRESS EXTRACTOR

CROSS-REFERENCE

This application is a continuation-in-part of application Ser. No. 08/791,422 filed on Jan. 30, 1997 now abandoned.

BACKGROUND OF THE INVENTION a) Field of the Invention

The present invention relates to an apparatus called "drum press extractor" for extracting liquids from a slurry formed of liquids and fibers. The word "slurry" as used hereinafter includes the combination of liquids and fibers with or without other solids. This term also includes wet fibers or any similar product.

b) Brief Description of Prior Art

In the stock-farming industry, it is of common practice to recycle separated farm animal manure as a compost and, if sufficiently dry, as a litter or green bedding for stock animals. Even when the manner is stored in large ponds, it is highly desirable to separate the fibers In order to reduce thick crust build-up over the ponds and thus facilitate agitation and increase storage capacity.

To achieve such a separation, it is of common practice to dilute the manure with water and then let It slide down by gravity along a screen. The liquids and very fine sediments pass through the screen and are collected under the same while the remaining portion of the manure consisting of wet fibers and some coarse sediments, is collected at the bottom of the screen and then used as such or processed through liquids extractor.

Such liquids extractor preferably consists of a "wringing machine" having a main roller and one or more auxiliary rollers whose external surfaces consist of a thin screen with perforations small enough to prevent fibers from passing through. The main and auxiliary rollers are mounted so that the fibers are squeezed between the main roller and each auxiliary roller consecutively. The dry manure fibers are collected at the bottom of the machine while the liquids extracted by the squeezing are collected within the auxiliary rollers and drained out of the same through conduits. So far, the auxiliary rollers used are commonly made of a thin screen mounted on disks themselves mounted on a shaft. These disks have openings to let the collected liquids move toward a conduit located on one or both sides of the auxiliary rollers.

A main problem with the existing "wringing machine" is that, because of the structure of the auxiliary rollers of the existing machine, it is impossible to apply a sufficient pressure onto the same without risking to deform and/or even damage the thin screens that are held only by the peripheries of the supporting discs.

Another problem with the existing machine is that a large amount of water is required to dilute the manure before letting it slide down along the screen and processing it through the machine.

A further problem with the existing machine is that the overall separation performance is reduced due to a "rewatering" of the separated fibers which occur when the fibers which have just been squeezed, act as a sponge and reabsorb liquid through the perforations of the screens of the auxiliary rollers which, as aforesaid, are very thin.

SUMMARY OF THE INVENTION

The object of the invention is to provide an apparatus for extracting liquids from a slurry formed of liquids and fibers, such as a farm animal manure, which apparatus is devised so as (1) to avoid deformation or damage to the screens in use,
(2) to reduce as much as possible rewatering of the solids once they have been separated;
(3) to ensure proper supply of the slurry at a constant pressure into the apparatus in use;
(4) to ensure proper liquids flow towards a trough without using a sealed cabinet or tank; and
(5) to separate the slurry and to squeeze the fibers in a single operation without having to add a large amount of water.

In accordance with the invention, this object is achieved by an apparatus for extracting liquids from a slurry formed of liquids and fibers, which comprises a rotatable drum having a main longitudinal axis and an outer surface covered with a resilient layer.

The apparatus also comprises a first draining roll having a first axis parallel to the main axis of the drum. The first draining roll is pressed against the drum in order to define therewith a first nip in which the slurry passes and is squeezed. This first drain roll comprises:

a first hollow cylindrical shell having a substantially uniform distribution of first openings extending radially with respect to the first axis; and a first perforated filter screen externally fixed onto the first hollow cylindrical shell.

The first filter screen has first perforations evenly distributed therein so that one part of the first perforations lies over the first openings of the first hollow cylindrical shell while another part of the first perforations lies over part of the first hollow cylindrical shell free of first openings. The first perforations are smaller in size than the first openings.

The apparatus according to the invention further comprises a second draining roll having a second axis parallel to the main axis of the drum. The second draining roll extends below the first draining roll and is pressed against the drum in order to define therewith a second nip downstream the first nip in which the already squeezed slurry passes and is squeezed again. This second draining roll comprises:

a second hollow cylindrical shell having a substantially uniform distribution of second openings extending radially with respect to the second axis; and a second perforated filter screen fixed externally onto the second hollow cylindrical shell.

The second openings of the second cylindrical shell are smaller in size than the first openings of the first cylindrical shell.

The second perforated filter screen has second perforations evenly distributed therein so that one pair of the second perforations lies over the second openings of the second cylindrical shell while another part of the second perforations lies over part of the second hollow cylindrical shell free of second openings.

As the first and second filter screens are fully supported by the first and second cylindrical shells, respectively, except over the first and second openings thereof, a sufficient pressure can be exerted onto the first and second draining rolls to squeeze the liquids out of the aggregate without risking to damage the filter screens. Moreover, since the opened surface areas leading within the first and second shells are substantially reduced by the not-opened surfaces of the first and second shells, the percentage of rewatering is substantially reduced as compared to screens standing alone in between the collected liquids and the separated fibers.

First wiping means are mounted under the first draining roll below the first nip and above the second draining roll for, on the one hand, wiping the squeezed slurry having passed through the first nip out of the first draining roll and directing this squeezed slurry towards the second nip, and on the other hand, guiding the liquids collected from the slurry through the first draining roll towards a liquid outlet to avoid spillage of the second draining roll.

Second wiping means are also mounted over the second draining roll below the second nip for wiping the squeezed slurry consisting essentially of separated fibers having passed through the second nip, out of the second draining roll and directing the so-separated fibers towards a solids outlet.

Preferably, the rotatable drum, the first and second draining rolls and the first and second wiping means are mounted onto a frame having a bottom portion with a trough on it, in which the collected liquids drop and are guided towards the liquids outlet. Preferably also, the first and second wiping means consist of plates each having a spring-biased edge in contact with the corresponding draining roll.

In the case where there is no preliminary screening, a reservoir should be mounted onto the frame above the rotatable drum and the first draining roll for receiving the slurry, storing a given amount of this slurry in order to build-up a constant pressure, and supplying the so-stored slurry into the first nip. Of course, a set of seals should then be provided to prevent overflow of the slurry supplied into the first nip over the rotatable drum and the first draining roll.

In accordance with a particularly preferred embodiment of the invention, an endless screw is mounted in friction contact on top of the rotatable drum to scrape the fibers that may remain attached to the drum and to direct the so-scraped fibers towards opposite ends of the rotatable drum, where they are recycled into the first nip.

Thus, the invention provides an apparatus for extracting liquids from an slurry formed of liquids and fibers, which, thanks to its structure, substantially reduces rewatering of the fibers once separated.

The apparatus according to the invention can be used to extract liquids from any kind of slurry formed of liquids and fibers. However, it is preferably used to process farm animal manure, and more particularly, bovine manure.

A non-restrictive description of a preferred embodiment of the present invention will be given hereinafter with references to the appended drawings.

DETAILED DESCRIPTION OF A PREFERRED EMBODIMENT

Figure 1:
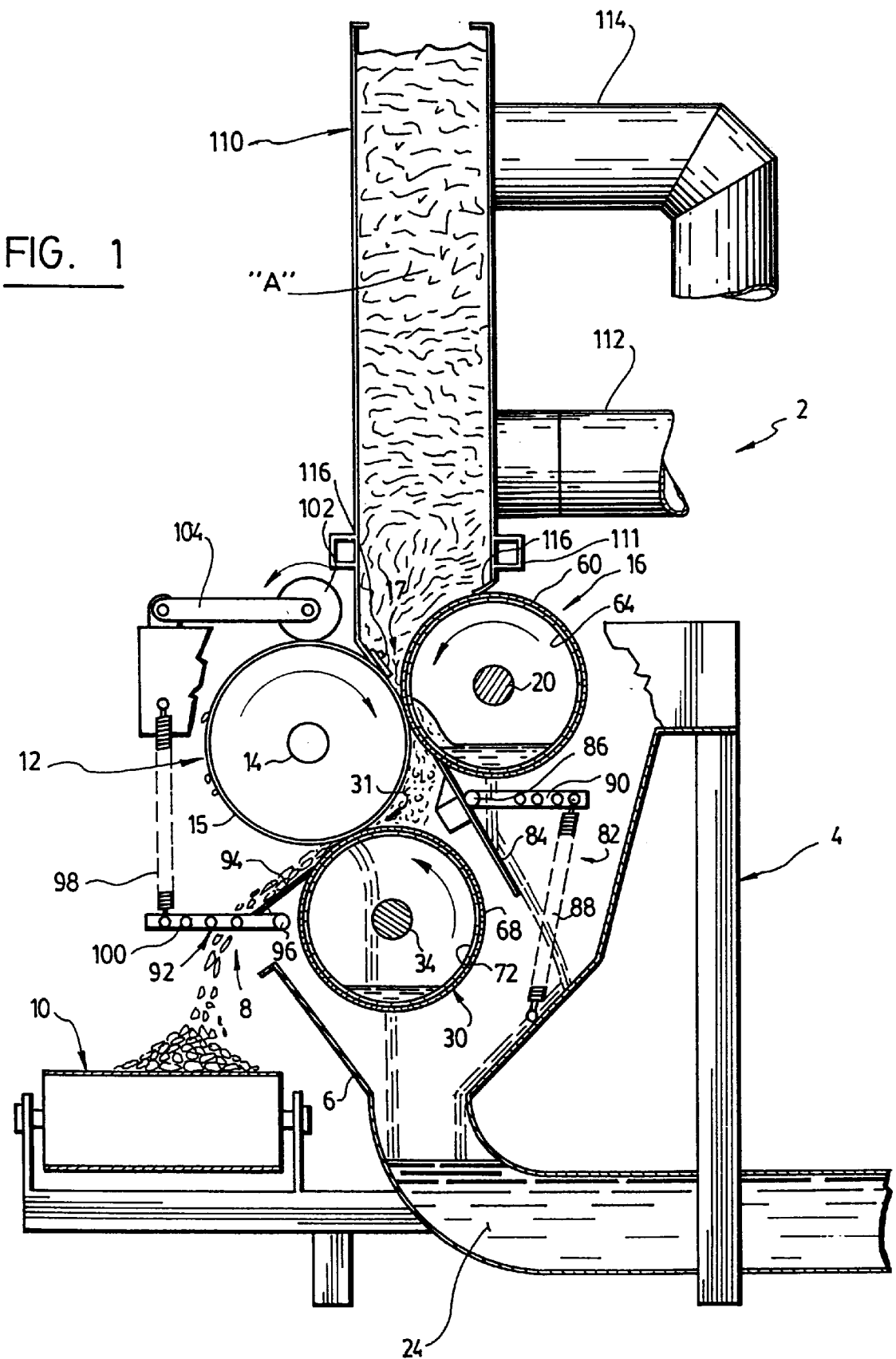
FIG. 1 is a side elevational cross-section view of an apparatus according to the present invention for extracting liquids from an aggregate.
Figure 2:
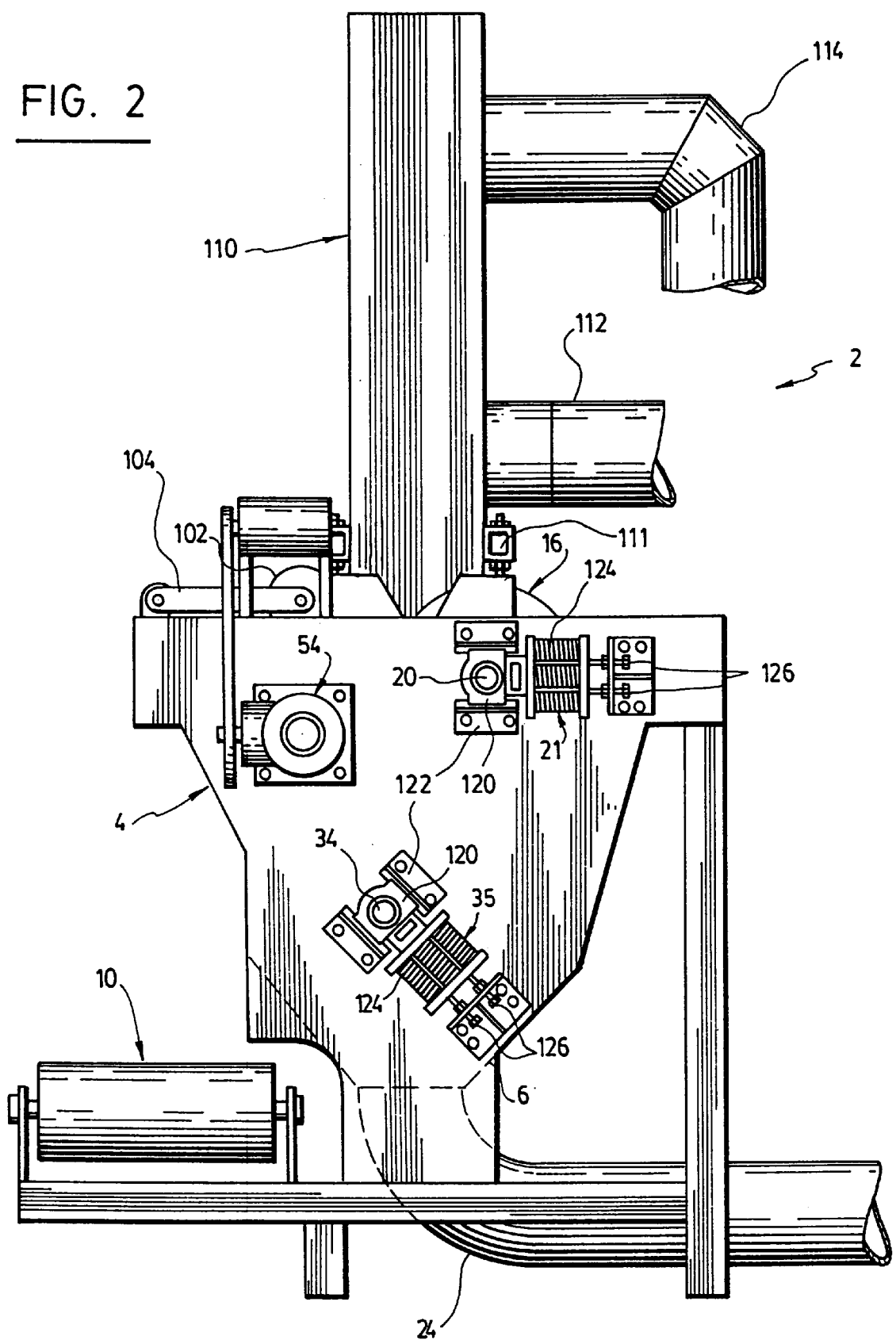
FIG. 2 is a side elevational view of the apparatus of FIG. 1, showing the pressure means used to press the draining rolls against the drum.
Figure 3:
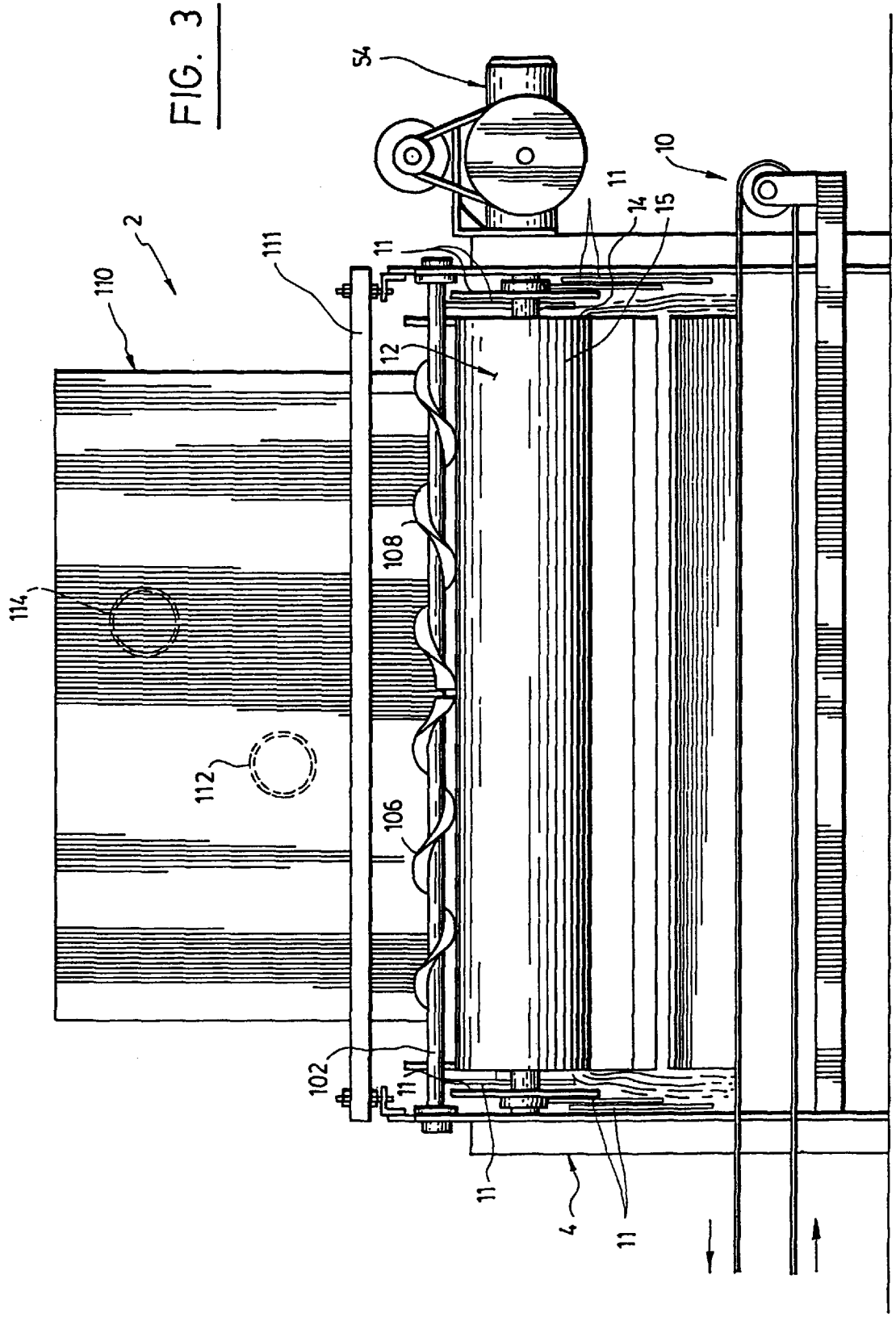
FIG. 3 is a front elevational view of the apparatus of FIGS. 1 and 2.

FIGS. 1 to 3 illustrate an apparatus 2 according to the present invention for extracting liquids from a slurry "A" formed of liquids, fibers and possibly other solids. This slurry preferably consists of diluted manure.

As is shown, the apparatus 2 comprises a frame 4 having a top portion on which a rotatable drum 12 is mounted. The drum 12 comprises a shaft 14 having a main longitudinal axis and an outer surface covered with a layer 15 of resilient material, such as rubber. Preferably, the apparatus 2 incorporates driving means 54 (see FIG. 3) for controllably rotating the drum 12 eventhough, in another possible embodiment, such a rotation could be achieved by external driving means connected to the shafts 4.

The apparatus also comprises a first draining roll 16 having a shaft 20 whose axis is parallel to the main axis of the drum 12. The first draining roll 16 is pressed against the drum 12 in order to define therewith a first nip 17 in which the slurry "A" passes in the direction shown with the arrow and is squeezed. First pressure means 21 (see FIG. 2) are mounted on the frame 4 and provided for this purpose to apply a requested pressure on the shaft 20 of the first draining roll 16 in order to press it against the drum 12. These means 21 may consist of standard ball bearings 120 which are slidably mounted on rails 122. The shaft 20 is mounted on the ball bearings 120 and springs 124 are connected to the ball bearings in such a manner as to exert a pressure onto the same. This pressure can be adjusted with a set of screws 126, as is known per se.

Figure 4:
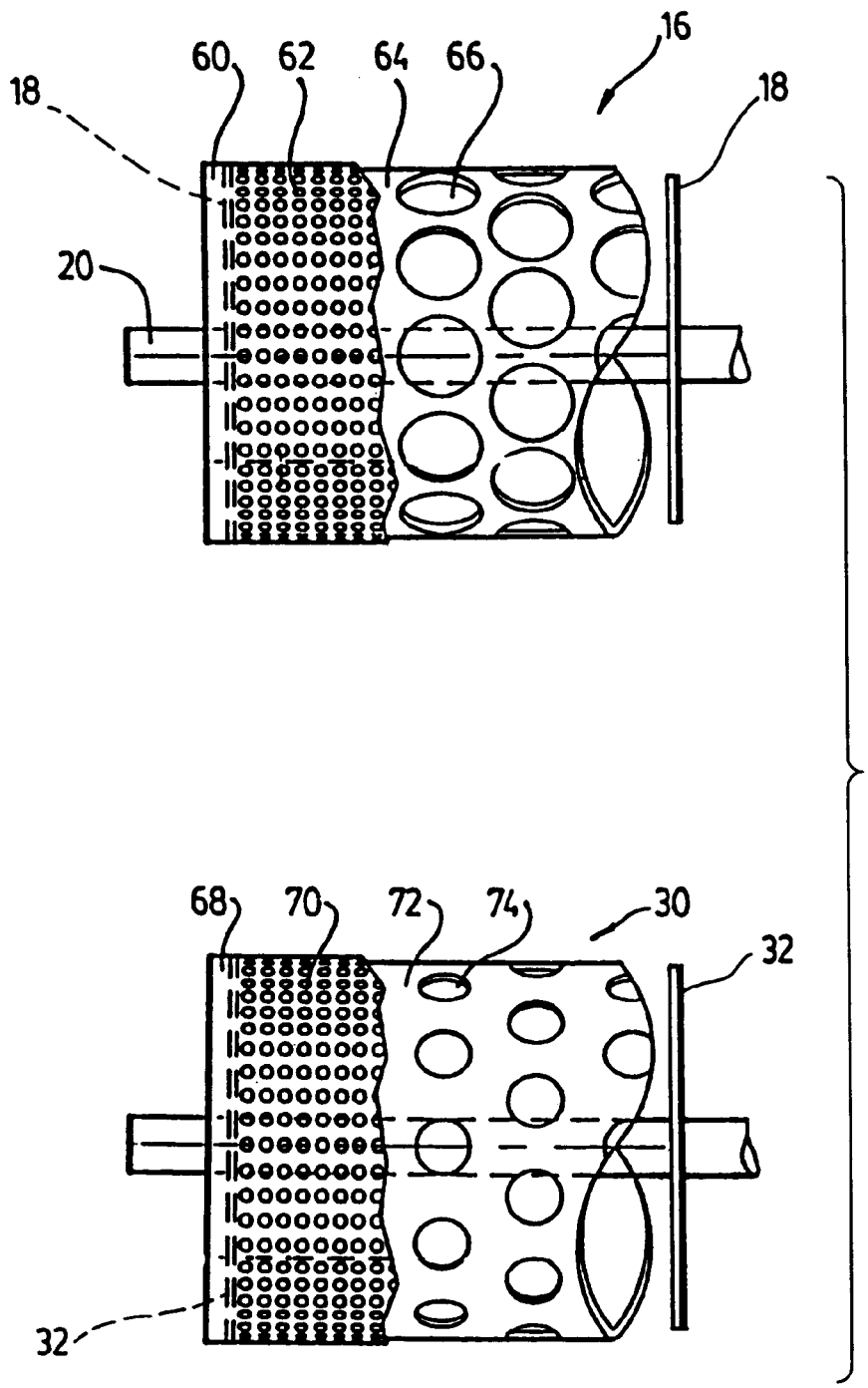
FIG. 4 is a partial front elevational view of the two draining rolls of the apparatus shown in FIGS. 1 to 3.

As is better shown In FIG. 4, the first draining roll 16 comprises a plurality of supporting members 18 fixed transversely onto the shaft 20. The first draining roll 16 also comprises a hollow cylindrical shell 64 which has a wall defining an outside surface. The hollow cylindrical shell 64 Is coaxial with the shaft 20 and is supported by the supporting members 18. This hollow cylindrical shell 64 has a substantially uniform distribution of openings 66 that extend radially with respect to its axis. Preferably, in the case of bovine manure, the surface ratio of the openings 66 to the outside surface of the cylindrical shell 64 ranges between 50 and 70%.

The first draining roll 16 further comprises a perforated filter screen 60, preferably made of steel, fixed to the cylindrical shell 64 against and around its outside surface. The filter screen 60 has perforations 62 evenly distributed so that some of these perforations 62 lie over the openings 66 of the cylindrical shell 64 while the remaining perforations 62 lie over all the remaining part of the first hollow cylindrical shell 64 that is free of openings 66. The perforations 62 are smaller in size than the openings 66. Preferably, in the case of bovine manure, the perforations 62 of the screen laying over the first cylindrical shell 64 ranges between 20 and 40% of the surface area of this screen.

As the reduced opened surface of the first draining roll 16 reduces the surface through which rewatering can occur, rewatering of the separated fibers is substantially reduced.

Moreover, as the wall of the cylindrical shell 64 is much thicker than the filter screen 60 and thus much stronger, a greater pressure can be applied onto first draining roll, as compared to the one that can be applied to a thin screen standing alone. As a result, a better squeezing is achieved.

Furthermore, using a hollow cylindrical shell 64 with a rigid wall, permits to use standard thin screens 60 which are commercially available. Using such a thin screen 60 also lowers the initial and replacement costs.

Last of all, as the filter screen 60 covers all the outside surface of the cylindrical shell 64, it has a gripping effect on the fibers, thereby increasing the whole apparatus efficiency.

The apparatus 2 according to the invention as shown in the accompanying drawings, also comprises a second draining roll 30 having a shaft 34 whose axis is parallel to the main axis of the drum 12. The second draining roll 30 extends below the first draining roll 30 and is pressed against the drum 12 in order to define thereinafter a second nip 31 in which the slurry that has just been squeezed in the first nip 17 between the drum 12 and the first draining roll 16 passes and is squeezed again.

Second pressure means 35 similar to the first pressure means 21 are also mounted on the frame 4 to apply a pressure on the shaft 34 of the second draining roll 30 in order to press it against the drum 12. Preferably, the second pressure means 35 are adjusted so that the pressure applied by it is greater than the pressure applied by the first pressure means 21.

As is better shown in FIG. 4, the second draining roll 30 comprises a plurality of supporting members 32 fixed transversely onto the shaft 34. The second draining roll 30 also comprises a hollow cylindrical shell 72 which has a wall defining an outside surface. The cylindrical shell 72 is coaxial with the shaft 34 and is supported by the supporting members 32. This cylindrical shell 72 has a substantially uniform distribution of openings 74 which extend radially with respect to its axis. The openings 74 are smaller in size than the openings 66 of the first draining roll 16. Preferably, in the case of bovine manure, the surface ratio of the openings 74 to the outside surface of the cylindrical shell 72 ranges between 10 and 25%.

The second draining roll 30 also has a perforated filter screen 68, preferably made of steel, fixed to the cylindrical shell 72 against and around its outside surface. The filter screen 68 has perforations 70 evenly distributed so that some of these perforations 70 lie over the openings 74 of the hollow cylindrical shell 72 while the remaining perforations 70 lie over all the remaining parts of the cylindrical shell 72 that is free of openings 74. The perforations 70 of the filter screen 68 have substantially the same size as the perforations 62 of the filter screen 60. Preferably, in the case of bovine manure, the perforations 70 of the filter screen 68 laying over the cylindrical shell 72 of the second draining roll 30 ranges between 20 and 40% of the surface area of the screen.

Using a second draining roll 30 with a smaller opened surface than the first draining roll 16 permits to apply a higher pressure to the second draining roll 30 which, thanks to its smaller opened surface, is structurally stronger and can withstand higher pressure. Such a higher pressure is necessary to compress the fibers further and extract more of the remaining liquids. The reduced opened surface of the second draining roll 30 also reduces the surface through which rewatering can occur, thereby further reducing unwanted rewatering.

First wiping means 82 are mounted under the first draining roll 16 below the first nip 17. These first wiping means 26 are used to wipe the squeezed slurry having passed through the first nip 17 off of the first draining roll 16 and to direct the so wiped slurry towards the second nip 31. The first wiping means 26 are also used to guide the liquids collected from the slurry through the first draining roll towards a liquids outlet 24 to avoid spillage of the second driving roll.

As is better shown in FIG. 1, the first wiping means 82 preferably comprises a plate 84 extending close to the first draining roll 16 below the same. The plate 84 is mounted on a pivot 86 having an axis parallel to the one of the first draining roll 16. A spring 88 connected to a lever 90 forces the upper edge of the plate 84 towards the outer surface of the first draining roll to achieve the requested wiping/scraping effect. In the meantime, the plate 84 that extends over the full length of the first draining roll 16, acts as wiping means and causes the liquids collected within the roll 16 to be diverted and not to fall back into the dried aggregate that is obtained at the outlet of the first nip 17. The so-diverted liquids fall to the bottom of the apparatus whose bottom portion supports a through 6 to which is connected the liquids outlet 24.

Second wiping means 92 are mounted over the second draining roll 30 below the second nip 31. These second wiping means are used to wipe the squeezed slurry having passed through the second nip 31 off of the second draining roll 30 and to direct the so-wiped slurry which mainly consist of fibers, towards a solids outlet 8.

Once again, the second wiping means 92 preferably comprises a plate 94 extending close to the second draining roll 30 over the full length of the same. The plate 94 is mounted on a pivot 96 having an axis parallel to the one of the second draining roll 30. A spring 98 connected to a lever 100 forces the upper edge of the plate 94 towards the outer surface of the first draining roll to achieve the requested wiping effect.

The solids collected by the plate 94 falls through the solids outlet 8 onto a conveyor 10 or any other disposal means.

It can be appreciated that, by properly selecting the springs 86, 98 and/or their points of connection onto the levers 90, 100, one may easily adjust the pressure exerted by the plates 84, 94 onto the corresponding rolls.

As can be seen, the first and second draining rolls 16, 30 are positioned onto the frame 4 in such a manner as to extend above the trough 6 in order to allow the same to receive all the liquids collected by the rolls and falling down through the same. To prevent the collected liquids which may be present in great amount, from splashing out at both ends of the frame, protective discs 11 may be fixed to the corresponding ends of the shafts 14, 20 and 34 of the drum, first and second draining rolls and pivot 86, at a short distance from these ends (see FIG. 3). These discs stop the liquids and direct them down to the trough 6.

Advantageously, an endless screw 102 is mounted in friction contact on top of the rotatable drum 12 to scrape the fibers that may remain attached to this rotatable drum, to direct these fibers towards the opposite ends of the drum and cause these fibers to be recycled into the first nip 17 This screw 102 is held by a pair of pivotable arms 104. Of course, to achieve the requested directional scraping, its tread is divided into two symmetrical opposite portions 106, 108 as is clearly shown in FIG. 3.

To provide a continuous and efficient supply of slurry onto the apparatus, a reservoir 110 is mounted by means of supporting members 111 on top of the frame 4 above the rotatable drum 12 and the first draining roll 16. The reservoir is connected to a supply pipe 112. It receives the aggregate from the pipe 112 and stores a given amount of this slurry in order to build-up a constant pressure. The bottom end of the reservoir is left open to allow supplying of the so-stored slurry into the first nip 17. In use, such a reservoir 110 is needed only in the case when there is no preliminary screening of the slurry. If there is such a screening, the collected slurry can be supplied directly into the first nip.

Of course, a set of seals 116 is provided to prevent overflow of the slurry supplied into the first nip 17 over the rotatable drum 12 and the first draining roll 16 and at the ends thereof. An overflow pipe 114 is also provided within the reservoir to return the slurry to Its supply source if the apparatus is stopped or slowed down as its supply is not adjusted accordingly. In use, the overflow pipe 114 also permits to keep a maximum head pressure and to allow regular supply.

The apparatus is of strong yet economical construction. The screens of the draining rolls 16, 30 may easily be replaced by other screens of different mesh to fit different kinds of slurry and the whole apparatus is easy to operate and very efficient in use. As a matter of fact, tests were carried out by the Applicant of an apparatus as shown in the drawings. These tests have proved to be very successful.

Although preferred embodiments of the invention have been described in detail herein and illustrated in the accompanying drawings, it is to be understood that the invention is not limited to these precise embodiments and that various changes and modifications may be made therein without departing from the scope and spirit of the invention as defined in the appended claims.

For example, although the slurry has been referred to as being preferably farm animal manure, it could very well be from other sources such as paper mill residues. Similarly, although the apparatus has been disclosed as comprising two draining rolls only, it could very well comprise three or more draining rolls, each roll having openings and perforations of a size and position selected as disclosed hereinabove with respect to the first and second draining rolls, in order to achieve maximum liquids extraction.

I claim:

1. An apparatus for extracting liquids from a slurry formed of liquids and fibers, the apparatus comprising:
    (a) a rotatable drum having a main longitudinal axis and an outer surface covered with a resilient layer;
    (b) a first draining roll having a first axis parallel to the main axis of the drum, said first draining roll being pressed against the drum in order to define therewith a first nip in which the slurry passes and is squeezed, said first draining roll comprising:
        a first hollow cylindrical shell having a substantially uniform distribution of first openings extending radially with respect to the first axis; and
        a first perforated filter screen externally fixed onto the first hollow cylindrical shell, said first filter screen having first perforations evenly distributed therein so that one part of said first perforations lies over the first openings of the first cylindrical shell while another part of said first perforations lies over part of the first cylindrical shell free of said first openings, said first perforations being smaller in size than said first openings;
    (c) a second draining roll having a second axis parallel to the main axis of the drum, said second draining roll extending below the first draining roll and being pressed against the drum in order to define therewith a second nip downstream the first nip in which the already squeezed slurry passes and is squeezed again, said second draining roll comprising:
        a second hollow cylindrical shell having a substantially uniform distribution of second openings extending radially with respect to the second axis, said second openings being smaller in size than the first openings of the first cylindrical shell; and
        a second perforated filter screen fixed externally onto the second hollow cylindrical shell, said second filter screen having second perforations evenly distributed therein so that one part of said second perforations lies over the second openings of the second cylindrical shell while another part of said second perforations lies over part of the second cylindrical shell free of said second openings, (d) first wiping means mounted under the first draining roll below the first nip and above the second draining roll for, on the one hand, wiping the squeezed slurry having passed through said first nip out of said first draining roll and directing said squeezed slurry towards the second nip and on the other hand, guiding the liquids collected from the slurry through the first draining roll towards a liquids outlet in order to avoid spillage of the second draining roll; and
    (e) second wiping means mounted over the second draining roll below the second nip for wiping the squeezed slurry having passed through said second nip out of the second draining roll and directing the so-separated slurry which consists mainly of said fibers, towards solids outlet.

2. An apparatus according to claim 1, wherein:
    the rotatable drum, the first and second draining rolls and the first and second wiping means are mounted onto a frame having a bottom portion with a trough in which the collected liquids drop and are guided towards the liquids outlet; and
    said first and second wiping means consist of plates each having a spring-biased edge in contact with the corresponding draining roll.

3. An apparatus according to claim 2, further comprising:
    a reservoir mounted onto the frame above the rotatable drum and the first draining roll for receiving the slurry, storing a given amount of said slurry in order to build-up a constant pressure, and supplying the so-stored slurry into the first nip; and
    a set of seals to prevent overflow of the slurry supplied to the first nip over the rotatable drum and the first draining roll.

4. An apparatus according to claim 3, further comprising:
    an endless screw mounted in friction contact on top of the rotatable drum to scrape the fibers that may remain attached to said rotatable drum and to direct said solids towards opposite ends of said rotatable drum.

5. An apparatus according to claim 4, wherein:
    said resilient layer is made of rubber; and
    said first and second perforated filter screens are made of steel.

6. An apparatus according to claim 5, further comprising:
    driving means to controllably rotate said drum;
    first pressure means to apply a first pressure on the first draining roll and thus press said first draining roll against the drum; and
    second pressure means to apply a second pressure on the second draining roll and thus press said second draining roll against the drum.

7. An apparatus according to claim 6, wherein:
    the surface ratio of the first openings to the outside surface of the first hollow cylindrical shell ranges between 50 and 70%; and
    the surface ratio of the second openings to the outside surface of the second hollow cylindrical shell ranges between 10 and 25%.

8. An apparatus according to claim 7, wherein the surface ratio of the first and second perforations to the whole surface of the first and second filter screens ranges between 20 and 40%, respectively.

9. An apparatus according to claim 2, wherein:
    the rotatable drum and the first and second draining rolls each comprises a shaft having opposite ends;
    the first wiping means comprises a pivot extending parallel to the shafts of the rotatable drum and of the first and second draining rolls, respectively, said pivot also having opposite ends; and protective discs are fixed to the ends of said shafts and pivot to prevent the collected liquids from splashing out and direct said collected liquids down to the trough.

10. An apparatus according to claim 7, wherein:

the rotatable drum and the first and second draining rolls each comprises a shaft having opposite ends;

the first wiping means comprises a pivot extending parallel to the shafts of the rotatable drum and of the first and second draining rolls, respectively, said pivot also having opposite ends; and protective discs are fixed to the ends of said shafts and pivot to prevent the collected liquids from splashing out and direct said collected liquids down to the trough.

11. An apparatus according to claim 1, further comprising:

a reservoir mounted onto the frame above the rotatable drum and the first draining roll for receiving the slurry, storing a given amount of said slurry in order to build-up a pressure, and supplying the so-stored slurry into the first nip; and a set of seals to prevent overflow of the slurry supplied to the first nip over the rotatable drum and the first draining roll.

12. An apparatus according to claim 1, further comprising:

an endless screw mounted in friction contact on top of the rotatable drum to scrape the fibers that may remain attached to said rotatable drum and to direct said solids towards opposite ends of said rotatable drum.

13. An apparatus according to claim 1, wherein:

said resilient layer is made of rubber; and said first and second perforated filter screens are made of steel.

14. An apparatus according to claim 1, further comprising:

driving means to controllably rotate said drum;

first pressure means to apply a first pressure on the first draining roll and thus press said first draining roll against the drum; and second pressure means to apply a second pressure on the second draining roll and thus press said second draining roll against the drum.

* * * * *